Patented June 5, 1945

2,377,352

UNITED STATES PATENT OFFICE 2,377,352

ISOMERIZATION OF NORMAL BUTENE

William J. Mattox, Riverside, Ill., assignor to Universal Oil Products Company, Chicago, Ill., a corporation of Delaware No Drawing. Application March 20, 1944, Serial No. 527,338

5 Claims. (Cl. 260—683.2)

This is a continuation-in-part of my co-pending application Serial No. 439,553, filed April 18, 1942, which, in turn, is a continuation-in-part of application Serial No. 389,450, filed April 19, 1941, which issued into U. S. Patent No. 2,289,375 on July 14, 1942.

This invention relates to the treatment of normal butene and is more specifically concerned with a novel process for isomerizing butene-1 to butene-2.

The butenes comprise mono-olefins containing four carbon atoms per molecule. The names of these hydrocarbons, their structure and boiling points are given in the following table for purposes of later reference.

| Name | Structure | Boiling point, °C. |
|---|---|---|
| 1-butene | $CH_3CH_2-CH=CH_2$ | $-5$ |
| 2-butene, cis | $\begin{array}{c} HC-CH_3 \\ \parallel \\ HC-CH_3 \end{array}$ | $+1$ to $1.5$ |
| 2-butene, trans | $\begin{array}{c} H-C-CH_3 \\ \parallel \\ CH_3-C-H \end{array}$ | $+2.5$ |
| Isobutene | $\begin{array}{c} CH_3 \\ \diagdown \\ C=CH_2 \\ \diagup \\ CH_3 \end{array}$ | $-6$ |

Recently the butenes have become of considerable importance to the petroleum industry as a result of the demand for high antiknock fuel suitable for use in high compression aviation engines. Isobutene has also shown considerable importance as a starting material in the manufacture of synthetic rubber. The butenes occur as constituents of cracked gases formed in plants operating primarily to produce gasoline either catalytically or thermally and can also be produced by the catalytic dehydrogenation of butenes which occur in large quantities in wet natural gases and in still and tank gases of petroleum refineries. Butenes are extensively employed at the present time in the alkylation operation wherein an isoparaffin is reacted with an olefin to form hydrocarbons having very desirable antiknock properties. As previously stated, isobutene is an important starting material in the manufacture of butyl rubber. The physical properties of the synthetic rubber is dependent to a large extent upon the purity of the reacting materials which controls the length of the molecule formed by the polymerization reaction. As will be noted upon reference to the table of physical properties previously presented, isobutene and butene-1 have boiling points which are approximately the same. It is, therefore, practically impossible to effect any separation of isobutene from a mixture of butenes containing substantial quantities of butene-1 by simple fractionation. In order to accomplish this separation, complicated schemes such as azeotropic distillation, compound formation, etc., have been utilized.

In recent investigations in alkylation, it has been found that the alkylate produced when employing butene-2 as the olefin in the reaction has better antiknock properties than that obtained when employing butene-1.

It is an object of this invention to provide a simple and efficient process for converting butene-1 into butene-2 which can be subsequently utilized in an alkylation operation to produce gasoline fractions having very desirable antiknock properties.

It is another object of the present invention to provide a simple method of separating isobutene from normal butene-1 by isomerizing the butene-1 to butene-2 which can subsequently be separated from the isobutene by fractionation.

I have discovered that magnesium fluoride either alone or deposited on a support is very effective in selectively isomerizing normal butene-1 to butene-2.

In one embodiment, the present invention comprises a process for isomerizing butene-1 by subjecting said butene-1 to contact under olefin isomerization conditions with a catalyst comprising magnesium fluoride.

The magnesium fluoride catalyst can be prepared by various methods, some of which are described below. A mixture of finely divided magnesium fluoride and an inert supporting material such as pumice, crushed firebrick, quartz and other refractory materials or a support which may possess some activity in its own stead such as alumina, silica, zirconia or thoria may be formed into shaped particles by the usual pilling or pelleting means. The lubricant used in this operation may be subsequently removed by calcination. Another method which may be employed for the formation of the catalyst is to impregnate the refractory supporting material with soluble magnesium salts such as magnesium nitrate, magnesium acetate and various other soluble magnesium salts and the wet impregnated material contacted with a second compound which acts as a precipitating agent and precipitates magnesium fluoride on the surfaces and in the pores of the refractory supporting material. These precipitating agents may comprise soluble fluorides such as sodium or potassium fluoride which react with the magnesium salt to form magnesium fluoride and a soluble compound, the latter being subsequently removed by washing. The composite may then be dried and calcined at moderately elevated temperatures of the order of 350–500° C. or slightly higher before being employed in the reaction zone.

In the preparation of supported catalysts such as magnesium fluoride on alumina, silica, zirconia, the magnesium salt which is substantially reacted with a fluorine-containing material to precipitate magnesium fluoride may be added to the chemically precipitated and purified hydrous oxides or hydrogels of the supports. Upon precipitating the magnesium fluoride and the subsequent drying and calcining of the composite, a catalyst is obtained in which the magnesium fluoride is uniformly distributed throughout the supporting material.

As previously stated, the magnesium fluoride can be employed as such, either in the granular, finely divided or pelleted form depending upon the particular type of operation being employed.

The processing conditions such as temperature and pressure which may be satisfactorily employed fall within the relatively broad range of temperatures of about 275–600° C. and pressures from substantially atmospheric to moderately superatmospheric of the order of 500 pounds or more. The preferable ranges of temperatures and pressures are from about 400–550° C. and substantially atmospheric to about 150 pounds per square inch pressure. The residence time of the reactants in the conversion zone is dependent to a large extent upon the temperature and pressure and the type of catalyst employed, but will ordinarily be equivalent to a hourly gaseous space velocity in excess of 100 measured as volumes of gaseous reactants per volume of catalyst per hour at standard conditions of temperature and pressure.

Various modes of operation may be employed depending upon the physical stage of the catalyst. Granular or pelleted forms of the catalyst comprising magnesium fluoride alone or magnesium fluoride on a refractory support may be disposed in a reaction zone in fixed bed relationship to the incoming reactants. The products from the reaction zone are then sent to a suitable separating system wherein the butene-2 is separated from the unconverted butene-1 which is recycled to the reaction zone.

Another mode of operation which may be employed is the introduction of the reactants in the vaporous form into a reaction zone containing finely divided catalysts therein, the rate of introduction of the reactants being such that the catalyst is motionalized and the catalyst mass is maintained in a fluidized state. The reaction products are removed from the conversion zone and entrained catalyst separated therefrom, said catalyst being returned to the reaction zone.

Still another mode of operation consists of passing a relatively compact bed of finely divided catalyst through the reaction zone maintained at the desired temperature and pressure in either concurrent or countercurrent direction to the incoming reactants.

After an extended period of operation, the catalyst loses activity due to the accumulation of carbonaceous materials on the surfaces and in the pores of the catalyst. Since the catalyst is stable at relatively high temperatures, it can be regenerated or revivified by the rapid oxidation of the carbonaceous material employing oxygen, air or oxygen-containing gases at temperatures sufficient to support the combustion of said carbonaceous material. The regeneration may be continuous or periodic depending upon the type of operation being employed. For example, in the fixed bed operation, at least two reactors are used, the catalyst therein being alternately contacted with the hydrocarbon reactants and the regenerating medium. In the fluid and moving compact bed type of operation, the catalyst is continuously withdrawn from the reaction zone and directed into a regeneration zone from which upon completion of the regeneration it is recycled to the conversion zone. In view of the fact that the reaction is selective, very small amounts of carbonaceous materials are deposited upon the catalyst. Therefore, it may be employed in the reaction zone for comparatively long periods of time before regeneration is necessary.

The charge to the process may comprise butene-1 either alone or in admixture with isobutene and/or butene-2. The charge also may include the $C_4$ paraffin hydrocarbons in relatively small amounts.

The following example is given to show the results obtained in the process of the present invention, although it is not intended to limit the scope of the invention in strict accordance therewith.

*Example*

A butene-1 charging stock having the following analysis on the volume basis: 97.8 butene-1; 1.8 butene-2; and 0.4 $C_5+$ was contacted with a pelleted magnesium fluoride catalyst disposed within a reaction zone maintained at a temperature of 400° C. and under atmospheric pressure at a gaseous space velocity of 140. The product withdrawn gave the following analysis:

| | |
|---|---|
| Isobutane | 0.9 |
| Isobutene | <0.1 |
| Butene-1 | 22.1 |
| Butene-2 | 76.1 |
| Normal butane | 0.6 |
| $C_5+$ | 0.3 |

I claim as my invention:

1. A process for isomerizing butene-1 to butene-2 which comprises subjecting said butene-1 under isomerizing conditions to the action of a catalyst comprising magnesium fluoride.

2. A process for isomerizing butene-1 to butene-2 which comprises subjecting said butene-1 under isomerizing conditions to the action of a catalyst composite comprising magnesium fluoride and a refractory supporting material.

3. A process for isomerizing butene-1 to butene-2 which comprises subjecting said butene-1 at a temperature of from about 275° C. to about 600° C. and under a pressure of from substantially atmospheric to approximately 500 pounds per square inch to the action of a catalyst comprising magnesium fluoride.

4. A process for isomerizing butene-1 to butene-2 which comprises subjecting said butene-1 at a temperature of from about 275° C. to about 600° C. and under a pressure of from substantially atmospheric to approximately 500 pounds per square inch to the action of a catalyst composite comprising magnesium fluoride and a refractory supporting material.

5. A process for the separation of isobutene from a mixture of normal butenes and isobutene which comprises subjecting said mixture under olefin isomerizing conditions to the action of a catalyst comprising magnesium fluoride whereby butene-1 is selectively isomerized to butene-2, and separating the isobutene from the reaction products.

WILLIAM J. MATTOX.